(12) United States Patent
Jain et al.

(10) Patent No.: US 10,214,118 B1
(45) Date of Patent: Feb. 26, 2019

(54) SYSTEMS, METHODS AND APPARATUSES ARE PROVIDED FOR AUTOMATED PASSENGER SEAT ADJUSTMENTS IN A VEHICLE

(71) Applicant: GM GLOBAL TECHNOLOGY OPERATIONS LLC, Detroit, MI (US)

(72) Inventors: Yashanshu Jain, Madhya Pradesh (IN); Shashank Rameswaran, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/829,396

(22) Filed: Dec. 1, 2017

(51) Int. Cl.
*B60N 2/02* (2006.01)
*B60N 2/00* (2006.01)
*B60K 35/00* (2006.01)

(52) U.S. Cl.
CPC ............ *B60N 2/0244* (2013.01); *B60K 35/00* (2013.01); *B60N 2/002* (2013.01); *B60K 2350/352* (2013.01); *B60K 2350/921* (2013.01); *B60N 2002/0268* (2013.01)

(58) Field of Classification Search
CPC .................................................. B60R 16/037
See application file for complete search history.

(56) References Cited

U.S. PATENT DOCUMENTS

| 8,616,654 | B2 | 12/2013 | Zenk et al. | |
|---|---|---|---|---|
| 2011/0295466 | A1* | 12/2011 | Ostu | B60N 2/002 |
| | | | | 701/45 |
| 2015/0021931 | A1* | 1/2015 | Konchan | E05B 47/0001 |
| | | | | 292/194 |
| 2017/0072816 | A1* | 3/2017 | Lippman | B60N 2/0232 |
| 2017/0080825 | A1 | 3/2017 | Bonk et al. | |
| 2017/0166087 | A1 | 6/2017 | Frye et al. | |

FOREIGN PATENT DOCUMENTS

WO   2017053503 A1   3/2017

* cited by examiner

*Primary Examiner* — Thomas G Black
*Assistant Examiner* — Ana D Thomas
(74) *Attorney, Agent, or Firm* — Lorenz & Kopf, LLP

(57) ABSTRACT

Systems, Methods and Apparatuses are provided for a seat adjustment system for a vehicle which includes: a plurality of sensors configured to produce sensor data associated with an occupancy by an internal or external user of a particular seat of the vehicle and a processor, configured to receive the sensor data to: determine a state of one or more settings of the seat adjustment system for the particular seat of the vehicle based on stored data or the received sensor data; determine in a near future whether a particular seat will be occupied by the external user based on the received sensor data; determine currently whether a particular seat is occupied by the internal user based on the received sensor data; and adjust settings of the particular seat in accordance with determinations of the state of settings and occupancy of the particular seat.

20 Claims, 12 Drawing Sheets

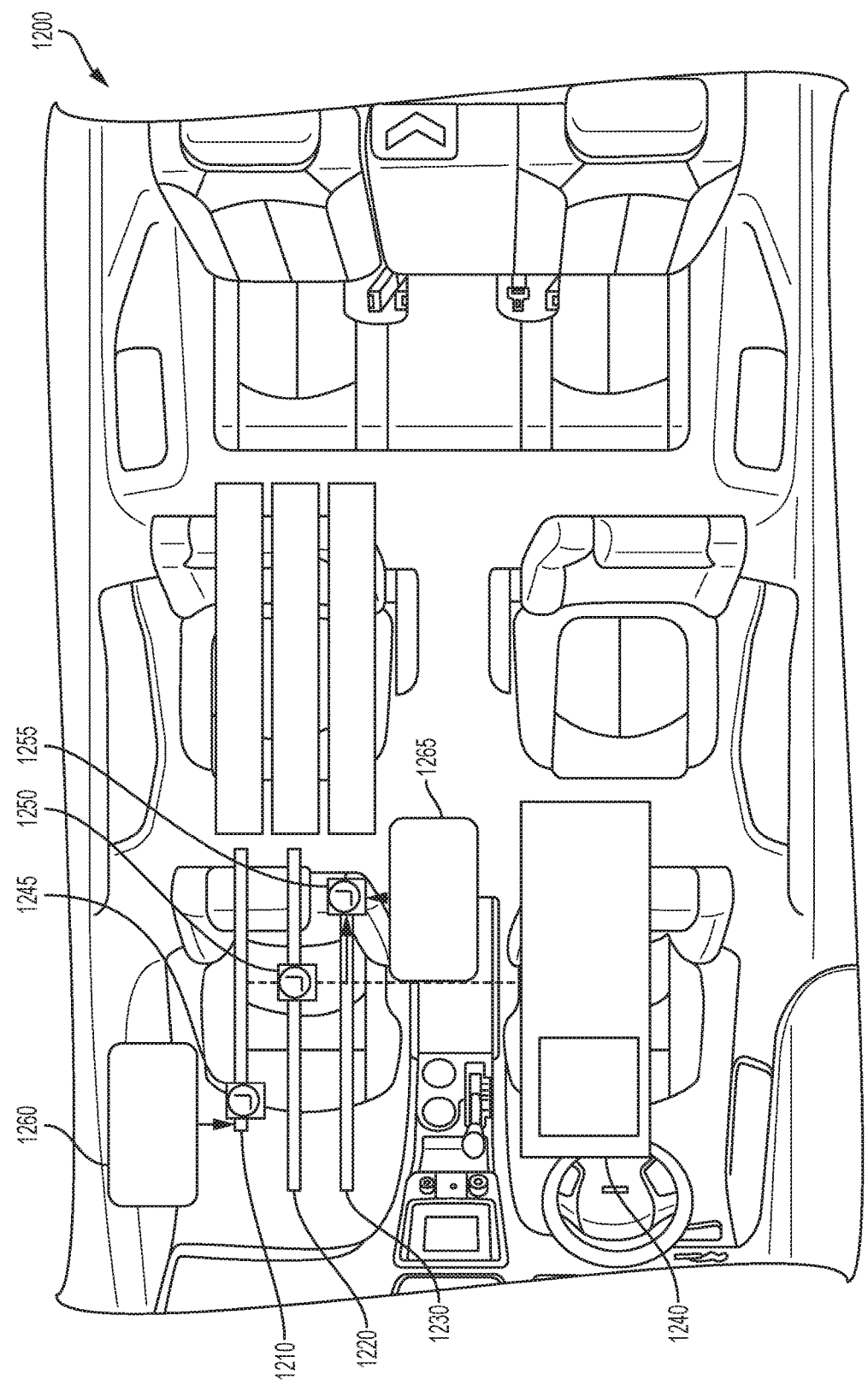

SYSTEMS, METHODS AND APPARATUSES ARE PROVIDED FOR AUTOMATED PASSENGER SEAT ADJUSTMENTS IN A VEHICLE

TECHNICAL FIELD

The technical field generally relates to automated seat adjustments, and more particularly relates to systems, methods and apparatuses for adjusting a position of a passenger seat of a vehicle, and even more particularly relates to a vehicle implementing such systems, methods and apparatuses.

INTRODUCTION

Often is the case, when a passenger enters a vehicle into the front or rear seat of the vehicle the seat needs to be adjusted in a forward or backward position to allow for more leg room or space for the passenger. While seats of a vehicle may have pre-set memory settings for the seat positions, the pre-set memory settings do not account for instances when either the front passenger seat or rear passenger seat is occupied or not occupied by a passenger. In other words, the pre-set memory settings are simply for adjusting and storing adjustments for the seats in pre-selected positions as adjusted by the occupant of the seat presently or in the past but do not adjust based on determinations of the occupancy of the passenger seats.

An autonomous vehicle is a vehicle that is capable of sensing its environment and navigating with little or no user input. An autonomous vehicle senses its environment using one or more sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

With autonomous as well as non-autonomous vehicles used for passenger rides and services such as ride sharing for example, there is the potential for passenger seats both prior to, during and after passengers have finished their ride to need to be adjusted. That is, for the vehicle to maximize the comfort of a particular passenger such as the sharing customers and others, the passenger seats need to be adjusted in a manner to maximize passenger legroom and related space.

Accordingly, it is desirable to provide an automated passenger seat adjustment system, method and apparatus for a vehicle. In addition, it is desirable to provide seat adjustment systems, methods and apparatuses for autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems, methods and apparatuses for adjusting seats based on sensed passenger occupancy within a vehicle is provided.

In one embodiment, a seat adjustment system for a vehicle, the seat adjustment system including: a plurality of sensors configured to produce sensor data associated with an occupancy by an internal or external user of a particular seat of the vehicle and a processor, configured to receive the sensor data to: determine a state of one or more settings of the seat adjustment system for the particular seat of the vehicle based on stored data or the received sensor data; determine in a near future whether a particular seat will be occupied by the external user based on the received sensor data; determine currently whether a particular seat is occupied by the internal user based on the received sensor data; determine currently whether a particular seat is not occupied by the internal user based on the received sensor data; and adjust settings of the particular seat in accordance with determinations of the state of settings and occupancy of the particular seat.

The seat adjustment system further includes: an autonomous driving system. The seat adjustment system further includes: the processor is configured to: adjust the particular seat in a forward direction; and adjust the particular seat in a backward direction wherein the adjust is based on the received sensor data. The received sensor data includes data from a sensor associated with a door of the vehicle which senses an opening or closing action of the door associated with the particular seat. The received sensor data includes data from a sensor associated with the particular seat which senses pressure on the particular seat. The received sensor data includes data from a sensor associated with the particular seat which senses an engaging or engagement of the particular seat. The processor is configured to: determine whether in the near future the external user will enter the vehicle and be seated in the particular seat by processing the received sensor data from an external sensor wherein the received sensor data includes data from the external sensor sensed of the external user entering the vehicle to be seated in the particular seat.

In another embodiment, a method for adjusting seats within a vehicle is provided, the method includes: configuring a plurality of sensors to produce sensor data associated with an occupancy by an internal or external user of a particular seat of the vehicle for use by a processor within the vehicle for adjusting the seats; determining by the processor a state of one or more settings of adjustment for the particular seat of the vehicle based on stored data or the sensor data; determining by the processor in a near future whether the particular seat will be occupied by the external user based on the sensor data; determining by the processor currently whether a particular seat is occupied by the internal user based on the sensor data; determining by the processor currently whether a particular seat is not occupied by the internal user based on the sensor data; and adjusting settings of the particular seat in accordance with determinations of the state of settings and occupancy of the particular seat.

The method further includes: adjusting by a graphic user interface on a display the settings of adjustment of the particular seat. The method includes: an autonomous driving method. The method further includes: taking an action by the processor based on the state of the adjustment. The action by the processor further includes: adjusting the particular seat in a forward direction; and adjusting the particular seat in a backward direction. The sensor data includes data from a sensor associated with a door of the vehicle which senses an opening or closing action of the door associated with the particular seat.

The received sensor data includes data from a sensor associated with the particular seat which senses an engaging or engagement of a seatbelt of the particular seat. The received sensor data includes data from a sensor associated with the particular seat which senses pressure on the particular seat. The received sensor data includes data from a sensor associated with the particular seat sensing engaging or engagement of a seatbelt related to the particular seat. The method further includes: determining whether in the near future the external user will enter the vehicle and be seated in the particular seat by processing the received sensor data from an external sensor wherein the received sensor data includes data from the external sensor sensed of the external user entering the vehicle to be seated in the particular seat. The sensor includes light detection, proximity and LiDAR sensors.

In yet another embodiment, a seat adjustment apparatus for a vehicle is provided which includes: a plurality of sensors configured to produce sensor data associated with an occupancy by an internal or external user of a particular seat of the vehicle and a processor module, configured to receive the sensor data to: determine a state of one or more settings of the seat adjustment system for the particular seat of the vehicle based on stored data or the received sensor data; determine currently whether a particular seat is occupied by the internal user based on the received sensor data; and adjust settings of the particular seat in accordance with a determination of the state of the setting and occupancy of the particular seat.

The apparatus further includes: an autonomous driving apparatus. The apparatus further includes: a graphic user interface on a display with the vehicle for adjusting the settings of adjustment of the particular seat.

It is noted that in various embodiments, the method contains steps which correspond to the functions of one or more of the various embodiments of the seat adjusting system and apparatus described above.

BRIEF DESCRIPTION OF THE DRAWINGS

The exemplary embodiments will hereinafter be described in conjunction with the following drawing figures, wherein like numerals denote like elements, and wherein:

FIG. 12 is a snapshot of a graphic user interface of the seat adjustment system, in accordance with an embodiment.

DETAILED DESCRIPTION

Figure 1:
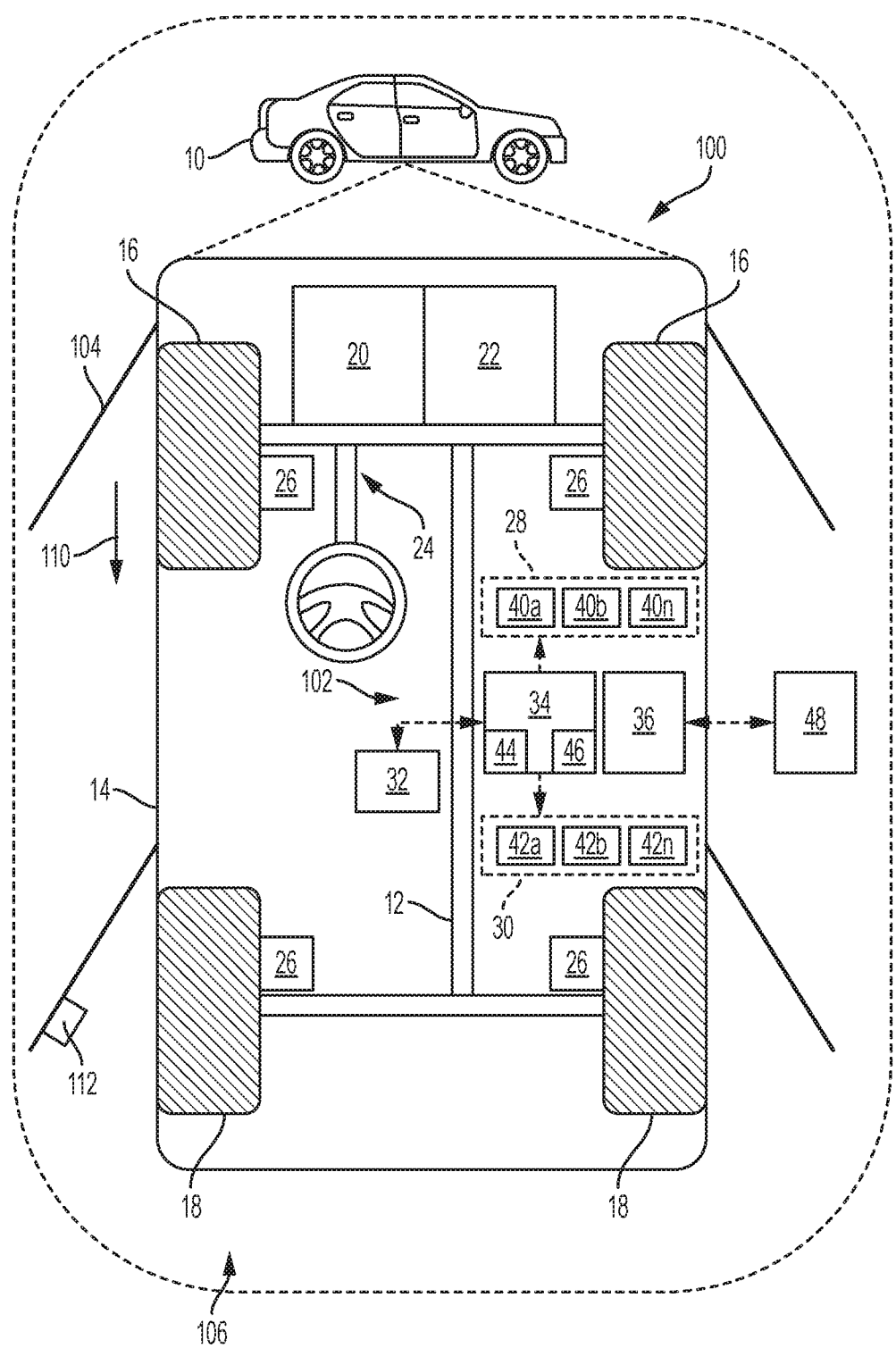
FIG. 1 is a functional block diagram of vehicle having a seat adjustment system, in accordance with an embodiment.

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

It is customary for a passenger to seat in a passenger seat and then to adjust the seat accordingly to a preferred position. In general, there has been a limited need to change the forward and backward position of a passenger seat as the number of different passengers for a vehicle is usually limited especially in the instances of a non-commercial use of a vehicle. Moreover, often the passenger seats are occupied by friends and family and the added convenience of further automation in the seat forward and backward positions has been of limited value as the seats may have available pre-selective memory settings suitable enough for this group of passengers. In addition, there may be operational issues raised for automated seat movement in certain conditions. For example, it may not be easy or convenient to activate or deactivate an automated seat function and this lack of convenience may result in contact or further unintended inconvenience to the driver or passengers. That is, if the front passenger seat were to re-position itself and move in a backward direction too far with a passenger in the immediate rear passenger seat which is directly behind the front passenger seat; the rear seated passenger as a result of an inability in instances, to unilaterally deactivate the automated movement, may experience an impact.

With the advent of non-commercial vehicles as well as autonomous vehicles used or to be used in ride sharing services, there is a need to have more automated passenger seat adjustments built in for default and active seat positioning to achieve a higher level of passenger comfort. This is not only for added passenger comfort but also because ride sharing services actively solicit feedback from passengers about the driver and vehicle comfort and overall ride experience. Hence, an improvement in the seat position may have a direct impact on the passenger experience. The improvement may also result in the feedback solicited from the passenger by the ride sharing service being better than would ordinarily be the case without such automated seat adjustment features adding incentives for drivers to have this feature in a vehicle.

Therefore, additional seat adjustment features are needed that detect passenger occupancy in the front and rear seats, adjust in an automated manner the seat position considering the passenger seat detected occupancies, and provide the appropriate mechanisms for convenient activation and de-activation by both the driver and the passenger or passengers to avoid seat impacts and injuries.

In addition, there is a need for convenient tools for calibrating the passenger seat positions during re-positioning and operation as well as default positions when passenger occupancy is detected in the front, rear or both seats.

Further, there is need for seamless integration of the automated seat adjustment process with other features in the vehicle such as the self-door locking mechanisms of the vehicle during operation.

There is needed the locating of a switch for the activation or deactivation of the automated seat adjustment system with a notification indicating to either or both the passenger and the driver the automated seat adjustment system has been activated, is about to be activated, is activated, or is not activated.

There is needed an integration of the automated seat adjustment system with sensors or indicators that the passenger door has been opened or a passenger is entering the vehicle to be seated in the rear or front passenger seats. These sensors may also be associated with external passengers which are passengers or users outside or entering the vehicle and with internal passengers which are passengers already in or seated in the vehicle.

There is needed an integration of the automated seat adjustment system with sensors within the seat for detecting occupancy or thresholds determining the types of occupancy of the seat by the weight of the passenger or as an indicator that the seat is occupied with a child seat for determinations of the optimum seat default location placement and/or adjustment.

There is needed an integration of the automated seat adjustment system with sensors within the seat for detecting occupancy of the seat for generating empirical data or historical data of usage of the seat occupancy for determinations of the optimum seat placement and/or adjustment based on this empirical or historical data during particular vehicle operations.

There is needed an integration of the automated seat adjustment system with sensors within the seat for detecting occupancy of the seat and generating and using empirical data of past, current or predictive usage of the seat occupancy for limiting seat adjustments, determining default adjustments of seat locations to limit power consumption caused by repetitive use of seat actuators adjusting the seat or changing the seat placements.

While references are made below to use of the automated seat adjustment system in autonomous vehicles, it is contemplated that such systems may be used in non-autonomous vehicles.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, vehicle 10 is characterized by some level of autonomy. For example, vehicle 10 may correspond to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, construction detection systems in accordance with the present embodiment may be used in conjunction with any vehicle that utilizes a navigation system to provide route guidance. Furthermore, vehicle 10 may be a traditional, non-vehicle.

While vehicle 10 is depicted in the illustrated embodiment as a passenger car, it should be appreciated that any type of vehicle, including motorcycles, trucks, sport utility vehicles (SUVs), recreational vehicles (RVs), marine vessels, aircraft, and other movable platforms employing a seat adjustment system may also employ the various methods and systems described herein.

In various embodiments, the vehicle 10 is an autonomous vehicle. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

In various embodiments, the data storage device 32 includes a map module which provides map data to the controller 34 and the autonomous driving system 70. In various embodiments, the map module accesses locally stored map data and/or map data received from a remote map data provider. For example, the map data provider provides map data via the communication system 36.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
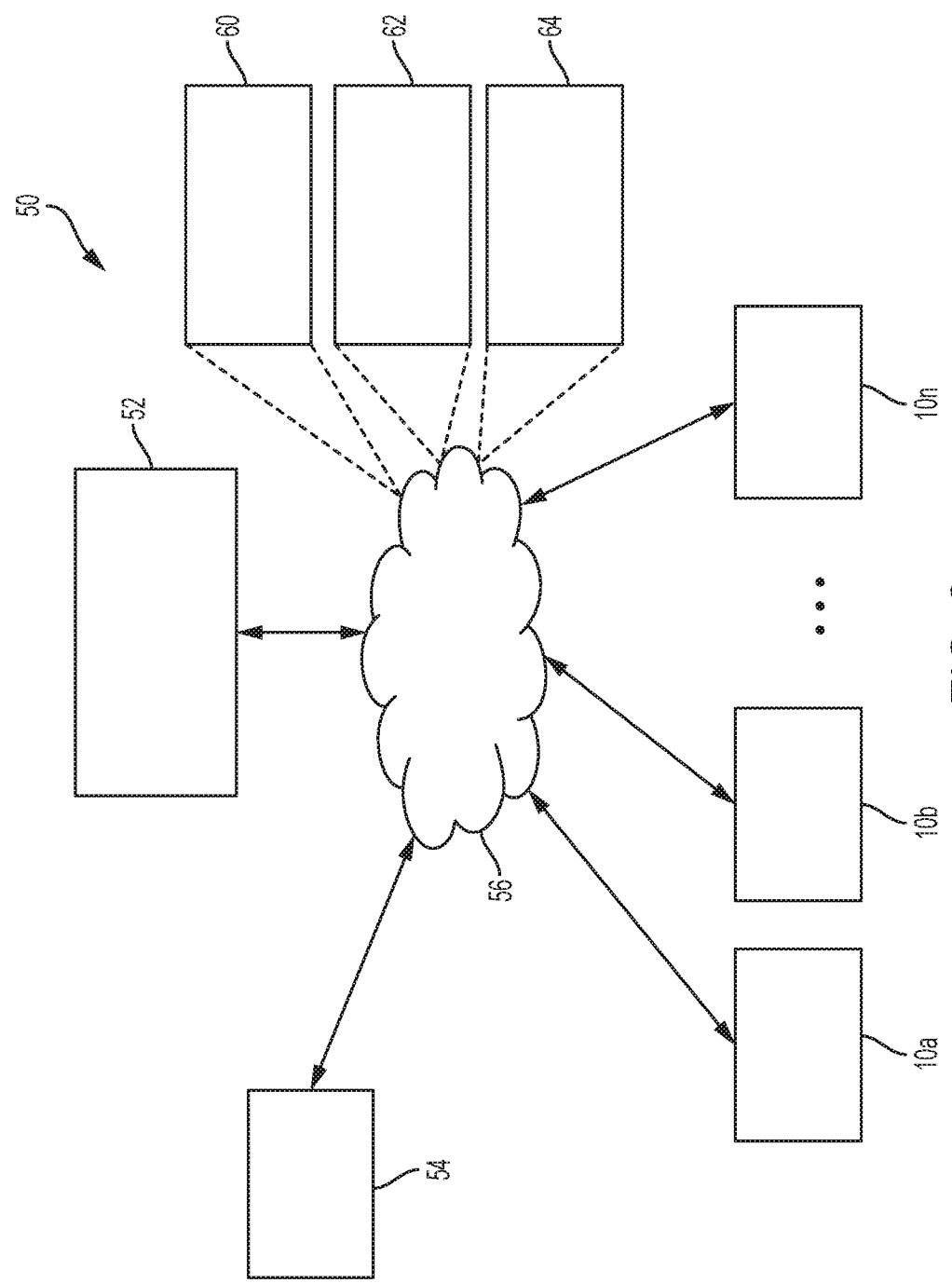
FIG. 2 is a functional block diagram illustrating a transportation system having one or more autonomous vehicles of FIG. 1, in accordance with an embodiment.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, the seat adjustment system 102 of the vehicle 10 includes at least some sensors of the sensor system 28 and the autonomous driving system 70. The controller 34 is configured to carry out the functions of the seat adjustment in accordance with one or a combination of embodiments described herein.

With continued reference to FIG. 1, the seat adjustment module 102 receives sensor input from appropriate sensing systems, such as sensors 201 and 202 shown in FIG. 1. This sensor input might include data indicating the presence of particular shapes of marker components and/or the physical location (e.g., three-dimensional coordinates) of those components within the interior of vehicle 10. For example, input may correspond to sensor information from sensor 201. Seat adjustment system 102 is configured to produce an output that includes information regarding the state of the seat adjustment system incorporated into vehicle 10. As used herein, the "seat adjustment system state" includes data indicative of whether and to what extent various components of the seat adjustment system have been adjusted. Stated another way, the seat adjustment system state might include a suitable data structure characterizing: how many occupants are present within the vehicle, where those occupants are located, whether seat adjustments have been adjusted for each of the occupants, the extent to which the seats have been adjusted. This information may also be shared with an external entity (such as 48 in FIG. 1).

In an example, the autonomous driving system comprises an electronic brake control module (EBCM) for brake apply. With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like.

Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
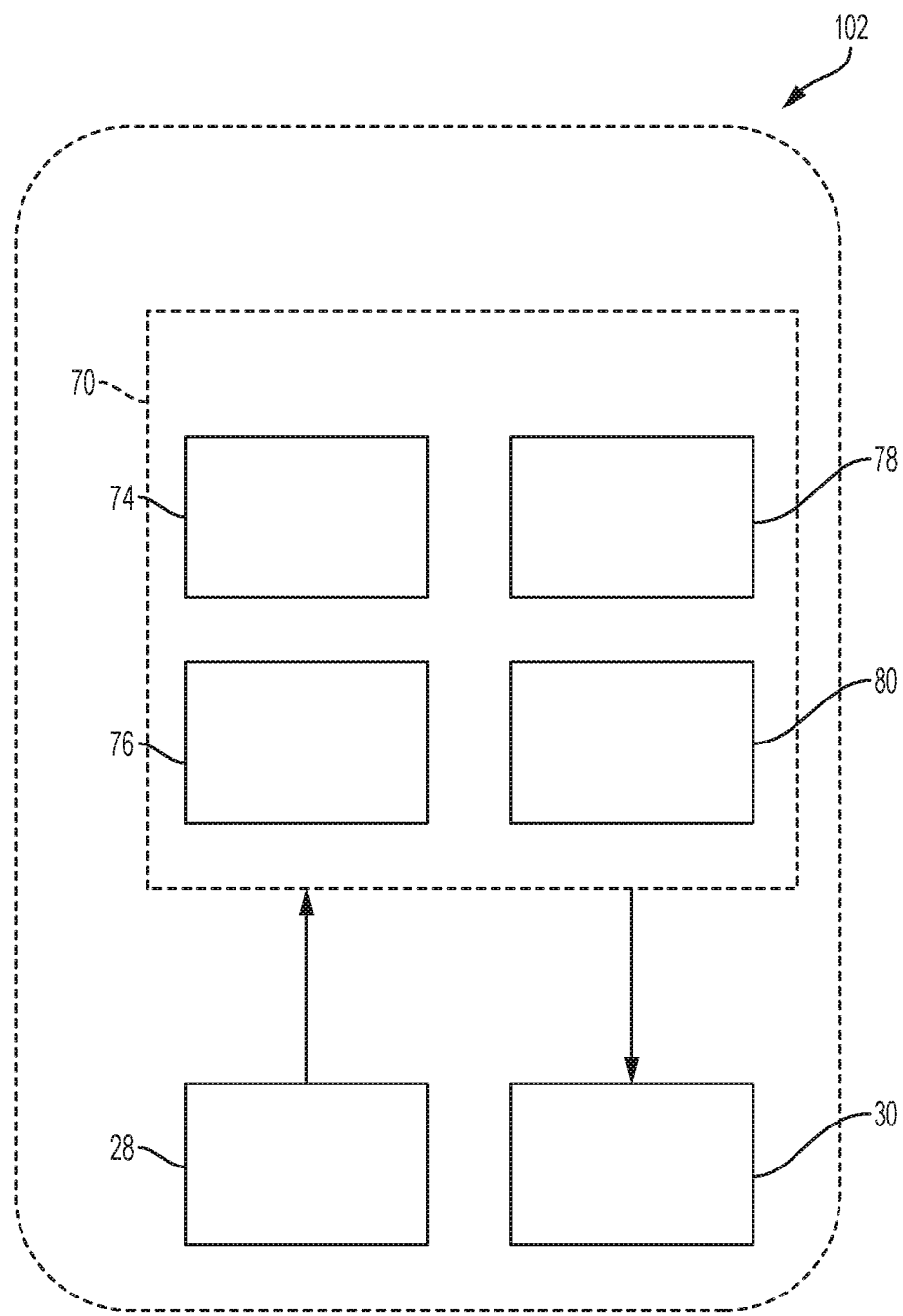
FIG. 3 is a functional block diagram illustrating an autonomous driving system, in accordance with an embodiment.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10. In various embodiments, the controller 34 shown in FIG. 3 is implemented in accordance with what is described herein with reference to the controller 34.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 may also be referred to as a sensor fusion system, as it enables visualization of input from several sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

The vehicle control system 80 is configured to communicate a vehicle control output to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

In various embodiments, the seat adjustment system 102 includes at least some of the sensors of the sensor system 28 (e.g. door sensor, seat-belt sensor, seat pressure sensor, proximity sensors, LiDAR sensors, optical sensors etc.) and embodies at least some of the functions of the autonomous driving system 70. In various embodiments, the sensor system 28 is configured to determine if at a door 104 (FIG. 1) of the vehicle a passenger is entering in a surrounding of a predetermined range.

The surrounding 106 (FIG. 1) of the vehicle 10 is an area in the close vicinity of the vehicle 10 and is also referred to as an environment surrounding the vehicle. In various embodiments, the surrounding 106 is shaped like a circle or an ellipse or corresponds to the shape of the vehicle 10 with the boundary lines of the surrounding area 106 having a predetermined distance to the outer boundary lines of the vehicle 10.

Referring again to FIG. 1, the seat adjustment system 102 is included in or part of the vehicle 10. In various embodiments, the controller 34 is configured to carry out the functions of the seat adjustment system of one or a combination of embodiments described herein. Controller 34 is configured to determine if at least one of the doors 104 is open or closed, determined if a passenger is seated in a particular seat, and to further determine if the surrounding 106 of the vehicle 10 a passenger is entering the vehicle 10 at a particular door. In various embodiments, the seat adjustment system detects a presence of persons, cars, and other objects within the surrounding 106 around the vehicle 10.

The term "autonomous" means that the vehicle is performing the movement without intervention of a human, or semi-automatic, i.e., with some human interactions during the movement of the vehicle.

In various embodiments, the sensor system 28 includes Light Detection and Ranging (LiDAR) sensors 116. Lidar (also called LIDAR, LiDAR, and LADAR) is a surveying method that measures distance to a target by illuminating that target with a pulsed laser light, and measuring the reflected pulses with a sensor. Differences in laser return times and wavelengths can then be used to make digital 3D-representations of the target. Lidar sometimes can also be referred to as laser scanning and 3D scanning, with terrestrial, airborne, and mobile applications.

In various embodiments, LIDAR sensors are arranged such that the door is in the field of view of the LIDAR sensors. In various embodiments, a LIDAR sensor sits atop the roof of vehicle 10. In various embodiments, LIDAR sensors are provided in the interior of the vehicle in capsule of sorts to allow for scanning of the interior of the vehicle. In various embodiments, other sensors (cameras, articulating radar, etc.) are utilized to determine if the door is open. In various embodiments, other sensors like presence sensors or cameras are utilized for occupant detection, i.e., to detect if an occupant is present in the interior of the vehicle 10 after using the ride sharing service.

Figure 4:
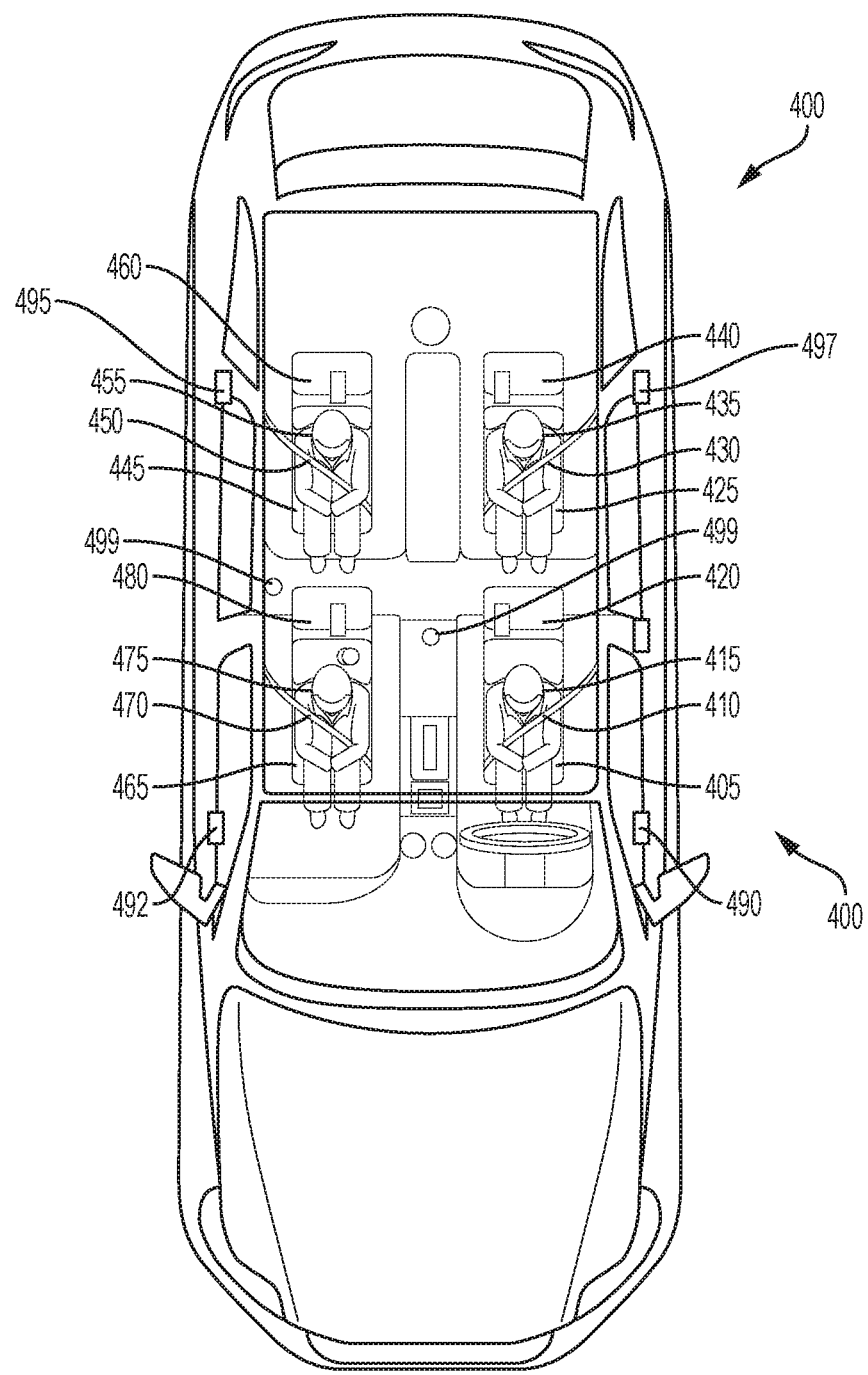
FIG. 4 is a diagram illustrating a seat adjustment system, in accordance with an embodiment.

FIG. 4 illustrates a top perspective of an exemplary configuration of vehicle with the seat adjustment system 102 of FIG. 1. The vehicle 400 is equipped with a front driver seat 420, a pressure sensor 405, and a seat belt detector sensor 410. The passenger 415 when sitting in the driver seat 420 will actuate the pressure sensor 405 and when securing the seat belt around him or herself, will actuate the seat belt detector sensor 410. In addition, there is a door sensor 490 for detecting opening and closing of the door. Similarly, the front passenger seat 480, is equipped with a pressure sensor 465, a seat belt detector sensor 470 and door sensor 492. Like the driver seat configuration, the pressure sensor 465 will detect a passenger 475 seated in the front passenger seat 480; the seat belt detector sensor 470 will detect when the passenger 475 is or has secured the seatbelt and the door sensor 492 will detect the opening and closing of the front passenger door. In the rear of the vehicle 400, there are two seats, a rear passenger seat 400 behind the driver seat 420 and a rear passenger seat 460 behind the front passenger seat 480. When the passenger 455 is seated in the rear passenger seat 460, the pressure sensor 445 detects the passenger 455 is seated in the seat 460 and the seat belt detector sensor 450 detects when the passenger 455 has engaged the seat belt. The door sensor 495 detects when the passenger 455 opens the passenger door and may subsequently detect the passenger 455 seated in the rear passenger seat 460, the engaging of the seat belt by the rear passenger seat belt detector sensor 450, the subsequent closing of the rear passenger door by rear passenger door sensor 495. Likewise, the other passenger seat of rear passenger seat 440 which is directly behind the front driver seat 420 has a seat belt detector sensor 430, a pressure sensor 425, and door sensor 497. When the passenger 435 opens the rear passenger door next to rear passenger seat 440, the passenger 435 can be detected as entering the vehicle to be seated in the rear passenger seat 440 by at least virtue of the door sensor 497. In addition, the pressure sensor 425 detects the passenger 435 is seated in the passenger rear seat. In addition, a manual override switch 499 is located within an arm length reach of the passengers in the front and rear seat as well as the driver. For example, the manual override switch 499 may be placed on the ceiling above the front seated passenger 475, in a pillar region between the front seated passenger 475 and the rear seated passenger 455 and in the middle center console region between the driver 415 and the front passenger 475. In an exemplary embodiment, the manual override switch 499 may also be actuated or deactivated via a display (not shown) in the front of the vehicle 400. Additionally, the manual override switch 499 may include an LED or other light to indicate an about to be ON, or an ON or OFF setting. The LED may be configured in a different colors and different designs for the various notifications which are not limited to the about to be ON and the ON and OFF designations. In addition, the LED is of a luminescence that is aesthetically pleasing, not interfering in driving the vehicle especially at night and for easy access. For example, the LED may have day and night modes. The manual override switch 499 may be equipped with child lock features to prevent easy activation or deactivation on the part of the children. The manual override switch 499 may be set in a default settings of an ON or OFF position and be further configured to reset to particular default setting during various stages of the vehicle 400 function such as stopping, restarting, parking, etc. Also, the manual override switch 499 may be activated with the locking system (not shown) of the vehicle 400 or when a passenger is seated in the either the front or rear seats. The user will via a display (not shown) in the front of the vehicle 400 be able to preset or calibrate the manual override switch 499 to any particular setting desired. The manual override switch 499 since activated or deactivated by a manual operation by the passenger or driver provides an immediate way by a quick action of a physical touch movement to deactivate or activate the automated seat belt adjustment system and therefore provides enhanced protection to stop seat adjustments that may result in contact with the passengers.

The seat adjustment system of the vehicle 400 may detect (though not limited) a number of different configurations as described in Table 1.0 below:

Exemplary Seat Adjustment Actions in Table 1.0

| Configuration | Front Passenger Seat | Rear Seat behind Front Passenger Seat | Operation |
|---|---|---|---|
| 1. | Passenger seated in front seat | No passenger seated in rear seat | Front passenger is adjusted in a backward direction |
| 2. | No passenger seated in front passenger seat | Passenger seated in rear passenger seat behind front passenger seat | Front passenger seat is adjusted in forward direction |
| 3. | Not Applicable | Not Applicable | Manual Override by passenger or driver of forward or backward direction adjustment resulting in ON/OFF of the automated seat adjustment |
| 4. | Items placed in front passenger seat instead of a passenger | | Pressure sensor actuated and weighted detected/No engagement of Seat Belt - Automated adjustments occurs till the Max Threshold. Threshold is used to set the Max distance a user can set for a seat to move during Automated seat adjustment |
| 5. | passenger about to enter the front seat in an autonomous vehicle detected by sensors of autonomous vehicle | | Automated adjustment of front seat may occur up until the passenger is seated in the seat, engages the seat belt, and when the auto door lock sensor is activated. |
| 6. | | passenger about to enter the back seat in an autonomous vehicle detected by sensors of autonomous vehicle | Automated adjustment of front seat may occur until the passenger is seated, the seat belt is engaged, and the auto door lock sensor is activated. The door sensor may be used to activate the system and/or await the auto door lock sensor activation |
| 7. | No adjustment | No adjustment | No automated adjustment if switched OFF by driver or passenger |
| 8. | Default setting, no adjustment or stopping of an adjustment | Default setting, no adjustment or stopping of an adjustment | Manual override when switched OFF or not switched ON by the driver or passenger. The manual override may occur when the user adjusts the seat manually and the manual adjustment |

-continued

Exemplary Seat Adjustment Actions in Table 1.0

| Configuration | Front Passenger Seat | Rear Seat behind Front Passenger Seat | Operation |
|---|---|---|---|
| | | | may also switch OFF the AutoSeatAdjust. |

Figure 5:
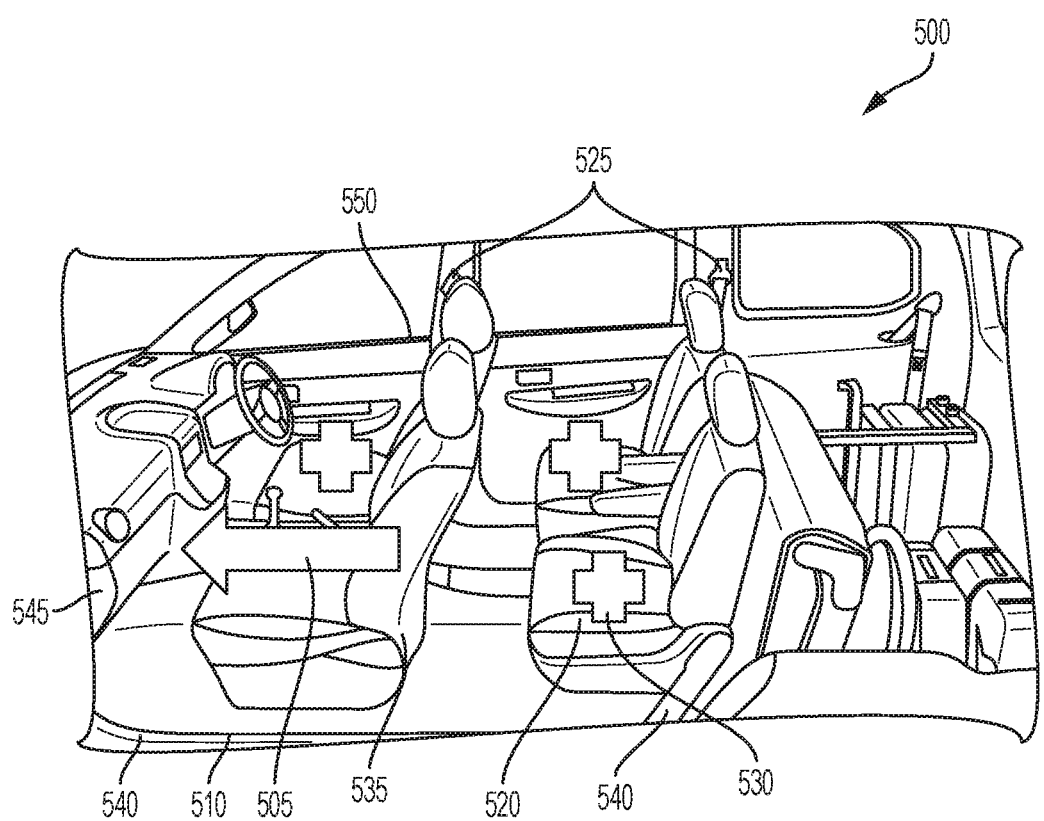
FIG. 5 is a diagram illustrating a seat adjustment system, in accordance with an embodiment.

FIG. 5 shows an exemplary diagram of a forward direction movement of a front passenger seat. A passenger is seated in rear passenger seat 520. Upon detection of the passenger of the in the rear passenger seat 520, the front seat may be moved in the forward direction 510 to provide for more space for the passenger in the rear passenger seat 520.

In various embodiments, the front passenger seat 510 is adjusted in response to the passenger seating in the rear passenger seat 520 and detection by a pressure sensor 530 that the passenger is seated in the rear passenger seat 520. Upon detection of the passenger seated, the front passenger seat 510 is moved in a frontward direction 505. Additionally, the pressure sensor 530 have be calibrated and set to various minimum or maximum thresholds for generating passenger occupancy data.

In various embodiments, the front passenger seat 510 is adjusted in response to the passenger seating in the rear passenger seat 520 and engaging a seat belt 525. Alternatively, the front passenger seat 510 is adjusted and moved in a forward direction 505 in response to both the pressure sensor 520 actuation by the seated passenger and the engaging of the seat belt 525. In other alternate embodiments, the front passenger seat 510 is adjusted upon the vehicle 500 in operation and in movement. For example, the front passenger seat 510 adjusted is tied or coupled to the operation of an automated door locking mechanism 550 that signals to the door locks to lock and this signal is also sent to the seat adjustment system to instruct the seat adjustment system to move and/or adjust the front passenger seat 510.

In various embodiments, detection of a passenger entering the vehicle by a door sensor 540 is detected by the seat adjustment system and the front passenger seat 510 when the door is opened. In an alternative embodiment, lidar, radar, light or proximity sensors 545 which are equipped in the vehicle 500 detect the passenger approaching the rear passenger door behind the front driver passenger door and the seat adjustment system may instruct (depending on system settings) the front passenger seat 510 to adjust and/or move forward. That is, prior to the passenger actually entering the vehicle 500 or sitting in the vehicle 500 the seat adjustment system may instruct the front passenger seat 510 to adjust and/or move forward. Alternatively, the seat adjustment system may instruct the front passenger seat 510 to move backward if, by the lidar, radar, light or proximity sensors 545, the seat adjustment system detects a passenger entering the front passenger seat. Alternatively, because of the possibility of other passengers approaching the vehicle 500 at a later time, for example a few minutes later, the seat adjustment may be set to occur when a particular sensor or set of sensors which are internal to the vehicle 500 are activated or in accordance with a prescribed delay. In addition, movement of the front passenger seat may be limited depending on historical information of the driver and passenger, machine learning such as location of the vehicle tied or coupled to the passenger pickup detection etc. For example, if at a particular location, a passenger is picked up and sits in the rear seat, and subsequently another passenger is picked up and sits in the front seat, the seat adjustment system may be calibrated so as to not to move the front passenger seat 510 in as great a forward direction 505 where only a passenger where to be seated or is anticipated to be seated in the rear passenger seat 520.

In various embodiments, particularly in autonomous vehicles having a host of sensors 545, locations and historical information can be incorporated into the vehicle 500 databases for retrieval at a particular location via GPS and for determinations of necessary seat adjustments and/or movements prior to the passenger actually being seated in the vehicle 500, and even at a more remote distance of prior to the passenger entering the vehicle 500 or opening the door of the vehicle 500. That is, seat adjustments may be stored for particular locations and used time and time again for a stored location upon a vehicle 500 going to or arriving at the stored location.

In various embodiments, particularly in autonomous vehicles, the front passenger seats can be adjusted using the described methodology on both the passenger and driver sides as desired.

Figure 6:
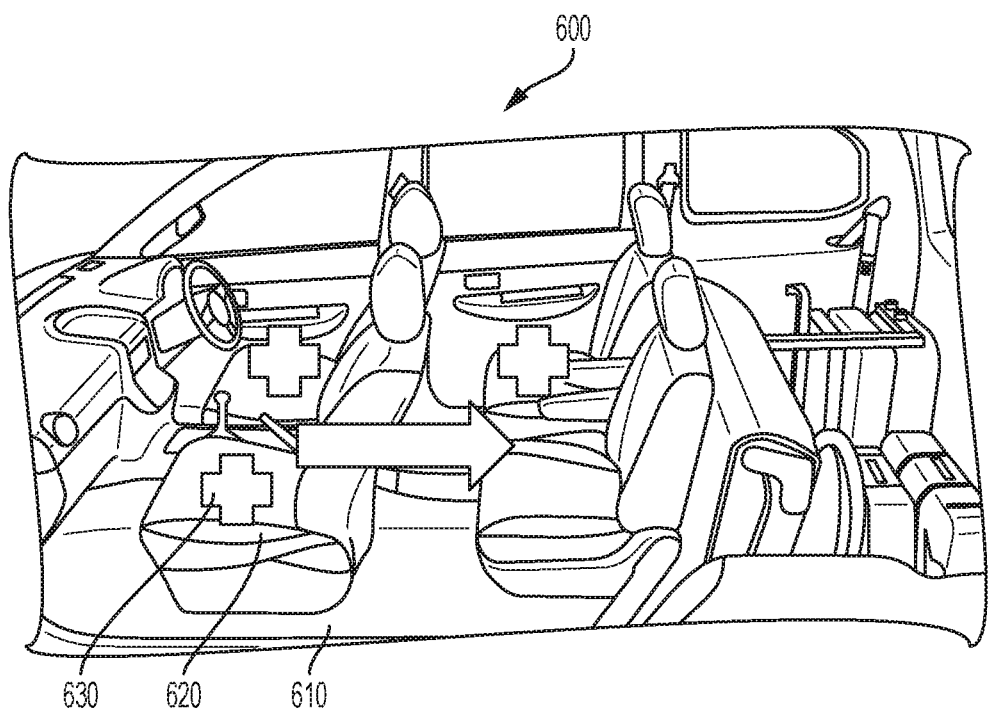
FIG. 6 is a diagram illustrating a seat adjustment system, in accordance with an embodiment.

FIG. 6 shows a diagram of a forward direction movement of a front passenger seat. The seat adjustment system detects a passenger 630 seated in the front passenger seat 620. The seat adjustment system moves the front passenger seat 620 in the backward direction 610 to create more space for the passenger in the front passenger seat 620. In various embodiment, the seat adjustment system may adjust the front passenger based on a set of conditions including a detection of the passenger entering the front seat, a passenger opening the front door, a passenger approaching the front from a radius or distance from the vehicle or front passenger door, historical data of the vehicle operation, data of vehicle when parked, data derived from the vehicle, machine learning and artificial intelligence techniques learnt about the driver and occupants of the vehicles on prior trips or habit driving.

In various embodiments, using information learnt from communications via text, email etc. of the driver with third parties the seat adjustment system may anticipate the passengers to be occupying the vehicle 600 and make the necessary adjustments.

In various embodiments, the seat adjustments are not limited to the movement of the seat in a forward or backward direction but may include a host of available seat adjustments such as the movement vertically up and down, movement of the seat from a reclining to an upward position or vice versa.

In various embodiments, not only may the front seat be adjusted, but the rear passenger seat may also be adjusted in accordance with the front passenger seat. For example, if passengers are determined to be seated in the front passenger seat as well as the rear passenger seat, the rear passenger seat if adjustments are available may be moved or adjusted backward for additional space. In addition, adjustments of the front passenger seat may be performed only in the recline, level, or incline adjustments.

Figure 7:
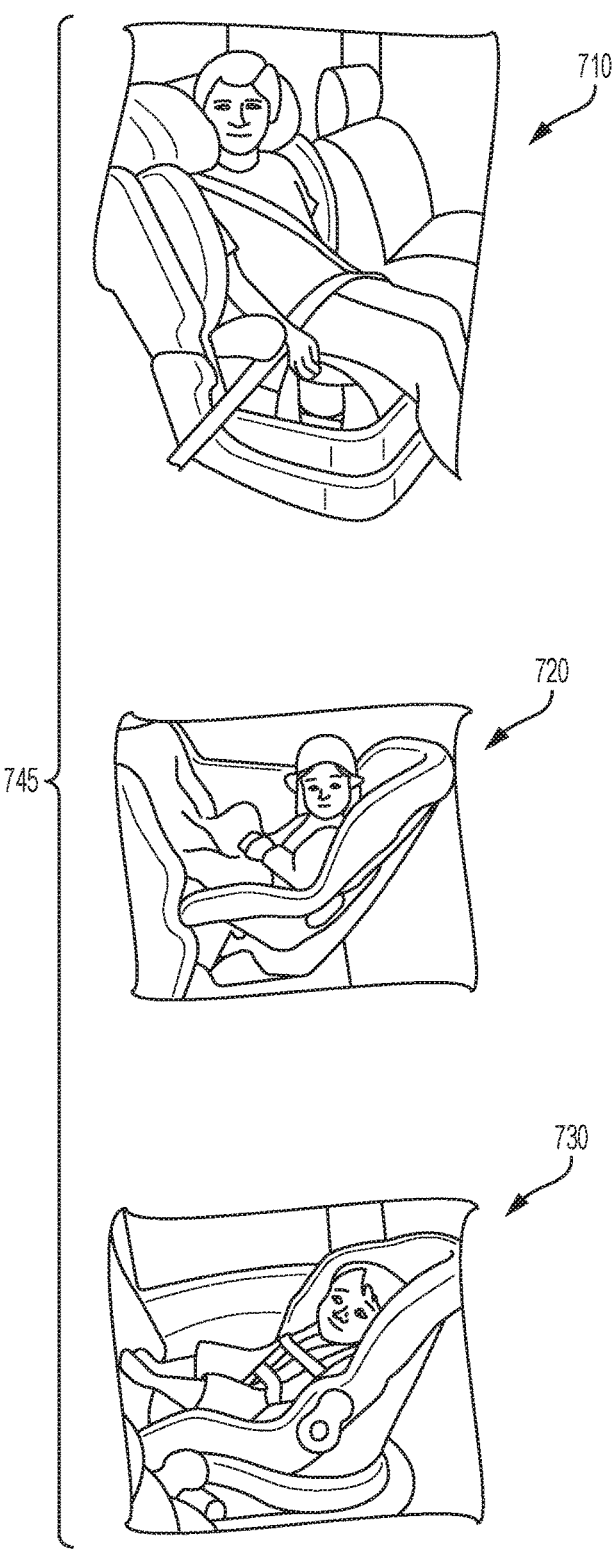
FIG. 7 is a diagram illustrating a seat adjustment system, in accordance with an embodiment.

FIG. 7 shows various configurations of child seats be used in a vehicle. For example, vehicle 700 may have a child seat 710 with a child in front facing direction with the seatbelt engaged as well as latches coupling the child seat 710 to the passenger seat. In an alternative embodiment, the child seat 720 may be a rear facing child seat with the seat belt engaged. In another embodiment, the child seat 730 may have a base coupled on which the child seat 730 is attached. The base is coupled with latches and/or a seatbelt. In each of such instances, the seat adjustment system may be deactivated or the front passenger seat may be pre-set in a position for the child seat. In addition, a proximity sensor 740 may be installed to detect the obstacle or child seat in the rear passenger seat to prevent the seat adjustment system from activating. In addition, the proximity sensor may be used to detect the presence of a child in the child in the child seat and alert the driver that there is a child in the child seat. Further, a pressure sensor 745 may be calibrated for weights of various child seats and recognize that a child seat is installed and generate an alert for soliciting a response from the driver. Further, the pressure sensor 745 may be also be used for medical applications such as monitoring the weight of the child and generate data of the weight of the child. In addition, the proximity sensor 745 may also monitor the child activity and alert the driver if the child is particularly lethargic. Further, the proximity sensor 745 may with the aid of the seat adjustment system calibrated for a child seat, the pressure sensor 745 detecting a child in the child seat provide alerts if the child is left in the child seat. For example, if the driver door is opened and closed and this is detected by the door sensor, and no other passengers are detected in the seats of the vehicle 700, the seat adjustment system upon detecting motion in the child seat via the proximity detector 745 would be capable of recognizing the presence of a child and generated an automated alert to the driver or perhaps communicate with the vehicle telematics systems to send alerts.

In various embodiments, Wi-Fi, WiMAX or Bluetooth connected cameras and smart devices may provide data to the vehicle and to the seat adjustment system for seat adjustments. For example, a passenger or driver using an app of a smart phone may be able to adjust the seats or seat positions of the vehicle 700 and make such adjustments remotely. In addition, the passenger or driver may be able to actuate related functions such as heating or cooling for the seats, unlocking the vehicle 700, opening the windows of the vehicle 700, receive alerts that the temperature of the vehicle 700 is increasing, and store such setting with the smart devices.

Figure 8:
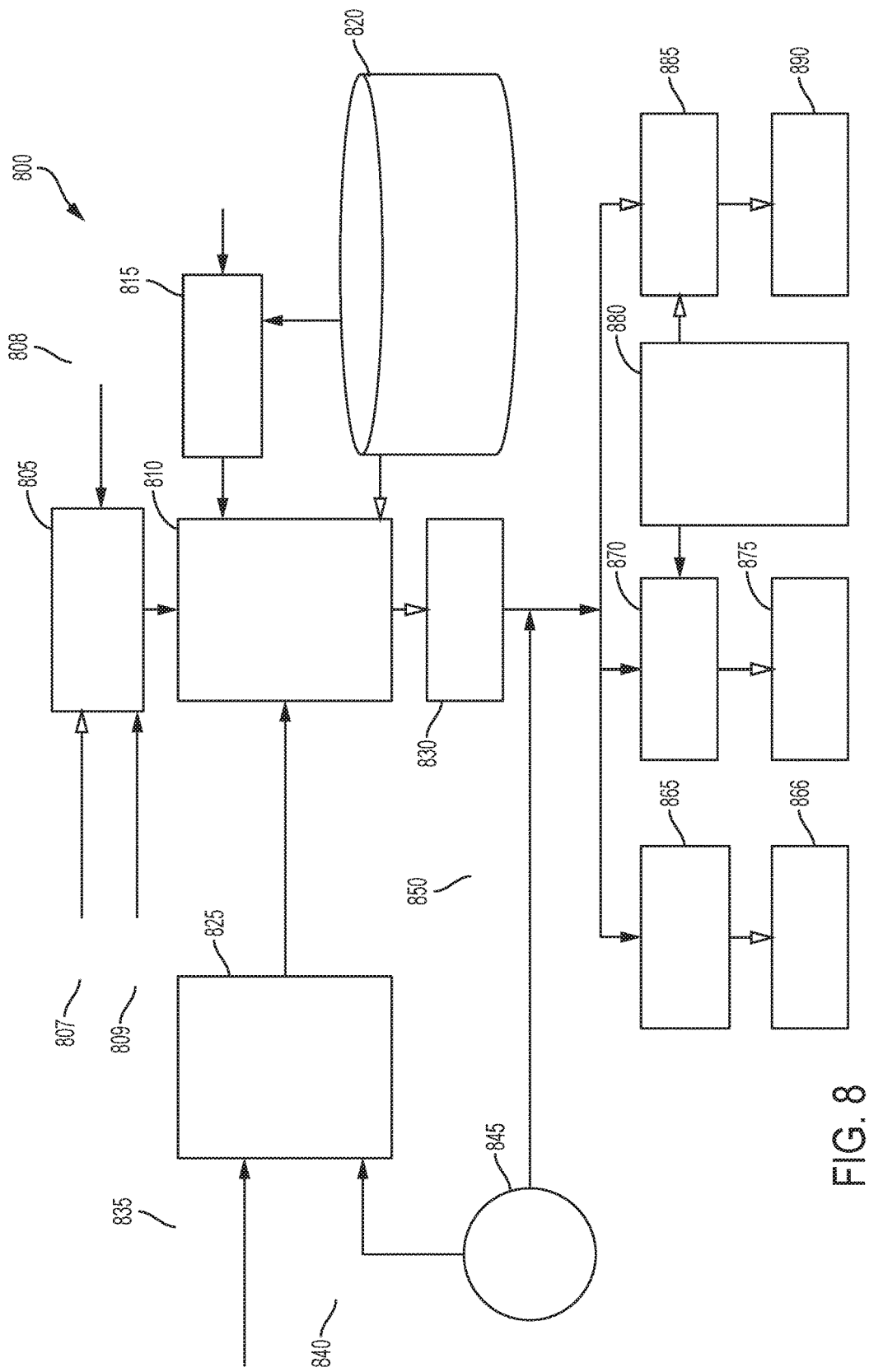
FIG. 8 is a functional block diagram of vehicle having a seat adjustment system, in accordance with an embodiment.

FIG. 8 illustrates a flow diagram of seat adjustment system 800 in accordance with an embodiment. In FIG. 8, initially, at block 805, a logic block and algorithmic solution is executed by various processors of the seat adjustment system 800 of the vehicle to determine the state of the passengers in the vehicle. Inputs to block 805 consist of an output from the seat pressure sensor 807, the door open/close sensor 809 and the seat belt status 800. At block 810, a determination is made of the passenger seat position, that is which seat or seats are occupied by the passenger. In an addition, block 810 receives inputs from block 825 of the activate seat sensing input and the instructions from the input of block 815 of moving the seat position to a default seat position. With respect to block 825, an input 835 of a signal tied to an autolocking mechanism of the vehicle after a particular distance or mini distance traveled and an input 840 for an auto seat adjust ON/OFF from the auto seat adjust switch 845 is sent to the activate seat sensing of block 825. The auto adjust seat switch 845 may be located in a "B" pillar of the vehicle or overhead of the front passenger seat for convenient access to actuate by the passengers and the driver. A signal from block 825 to activate or not activate the seating sensing is sent to block 810 to detect the passenger seating position. Block 820 generates instructions of calibrating a value for the length of the seat movement, the stored values for the last seat adjustment (ON/OFF) and the seat default position. Outputs from block 820 are sent to block 815 to move the seat to a default position. In addition, block 815 receives input from a key remote for triggering the move seat to a default position function at block 815. At block 830, the status of the seat adjust adjustment is determined and if the auto seat adjust function has not been performed then output signal is sent to adjust the particular passenger seat. Also, input at 850 is received of an interrupt operation if OFF is pressed during the seat movement. Next, the result of the seat detection function is sent to one of three blocks of block 865 when it is determined that both the front and rear seats are occupied, to block 870 when only the front seat is occupied and to block 885 when only the rear seat is occupied. Also, if the state of block 865 is determined then block 865 is triggered of no action to the seat adjustment. If the state of block 870 is determined then block 875 is triggered and the seat is moved backward. Additionally, the status determined by block 870 and block 885 is further checked or determined by receipt of an input from block 880. Block 880 determines using a proximity which may be placed below the front dash or behind the front seat of both as an option, a presence of movement in a particular seat and determination of whether the particular seat is occupied. If the state of block 885 is determined of only the rear seat is occupied, then block 890 is triggered and the front seat is moved forward.

Figure 9:
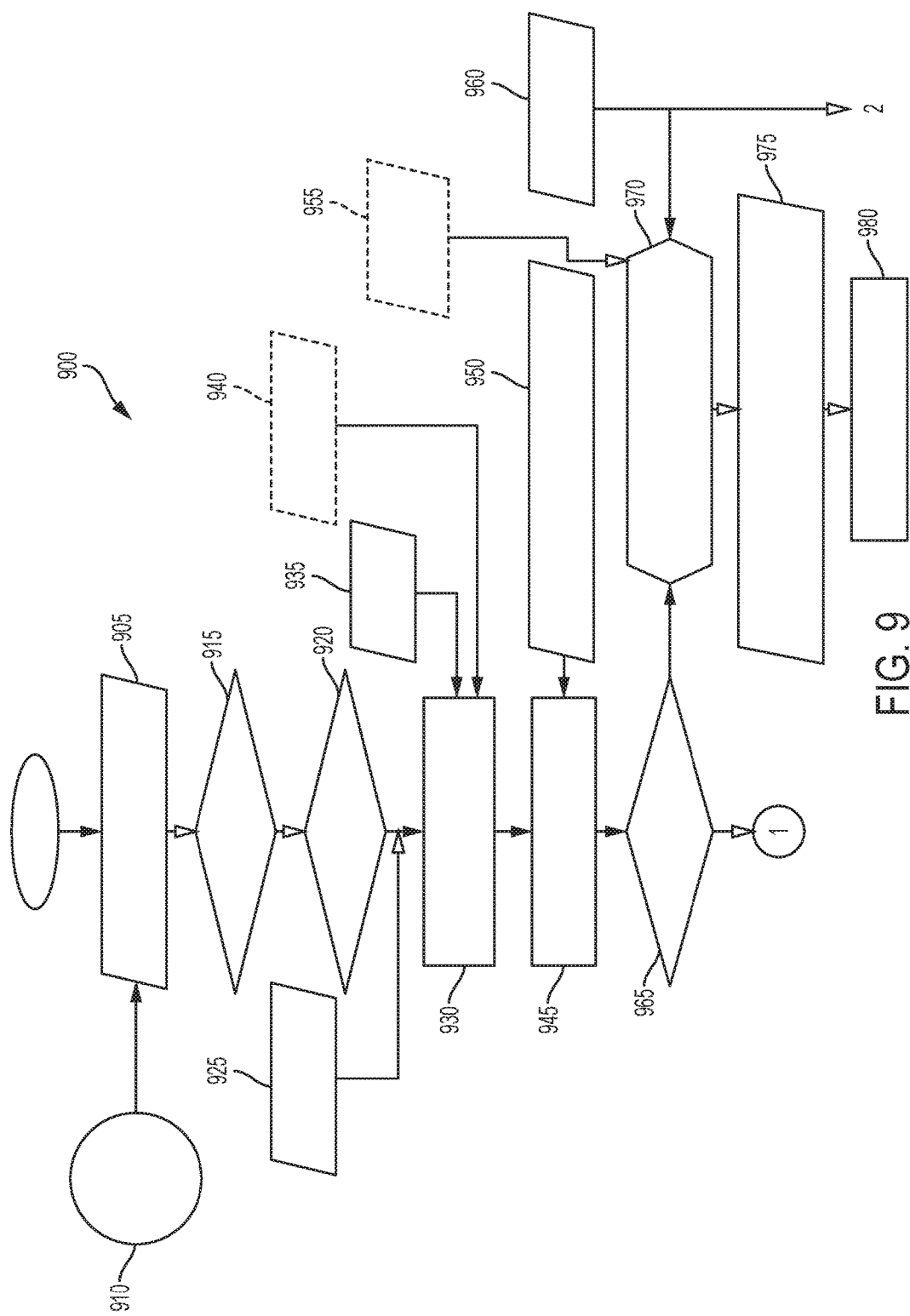
FIG. 9 is a flowchart illustrating the steps of a seat adjustment method, in accordance with an embodiment.
Figure 10:
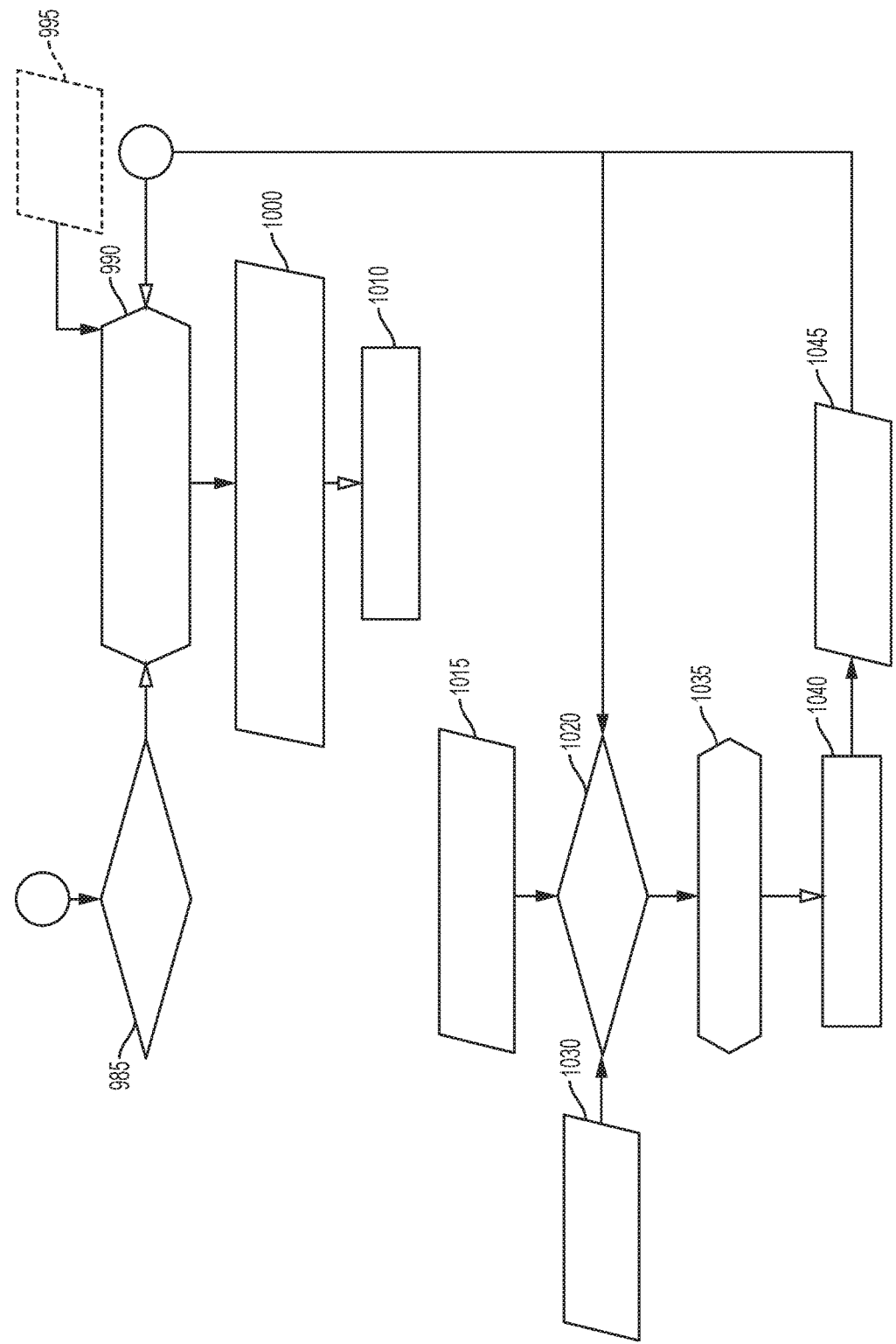
FIG. 10 is a flowchart illustrating the steps of a seat adjustment method, in accordance with an embodiment.

FIG. 9 discloses a flowchart of the seat adjustment system process flow in accordance with an exemplary embodiment. The flowchart 900 of the seat adjustment process, initially begins at 905 with a determination of whether the auto door lock signal which is coupled to the auto seat adjust signal is ON/OFF. Input of the signal status is received from 910. If "ON", then the seat adjustment system looks for the auto door lock signal at 915. When actuated, then at 920, the auto seat adjust is actuated. A determination is made if the door status is open or closed at 925. A computation is performed at 930 using various algorithmic solutions of processors of the seat adjustment system and input from 925 as well as input from 935 of the seatbelt status, and the seat pressure sensor at 940 to determine the seating in the front and rear of the vehicle. At 945, data or instruction related to the front seat forward length and front seat backward length are received at 950 where the appropriate determinations are generated. For example, the forward seat length adjust or the seat backward length adjust can be set to a default setting or can be calibrated on a display of the vehicle. At 965, a determination if only the front seat was occupied. While, for example at 970, the current seat position is greater than seat backward length adjust and the auto door lock signal is ON and the proximity sensor indicates a "stop" from a signal from block 955 of the back seat proximity sensor and from a signal from the current seat position ("CSR") at 960; an indication of activation at 975 is instigated by a blinking of the automated seat adjust for approximately 5 sec. or a particular set time, and/or a display of activation on the center console. At 980, the move seat backward function is commenced to a seat backward point. At 985, if it is determined that only the back seat is occupied, then at 990 while the current seat position is less than seat forward length adjust and the auto door lock signal is ON with the proximity sensor indicates a "stop" from the front seat proximity sensor 995 and an update of the current seat position is received from 1045; the seat is moved to a move seat forward point at 1010. At 1015 a remote key actuation sends a signal to 1020 where it is determined if the current seat position is equal to the seat default position from data from 1030 of the seat default position, then a waiting period of 1 minute at 1035 occurs. At 1040, a move seat to point function occurs and at 1045 an update as a result of the seat movement to an updated current seat position at 1045 is executed.

Figure 11:
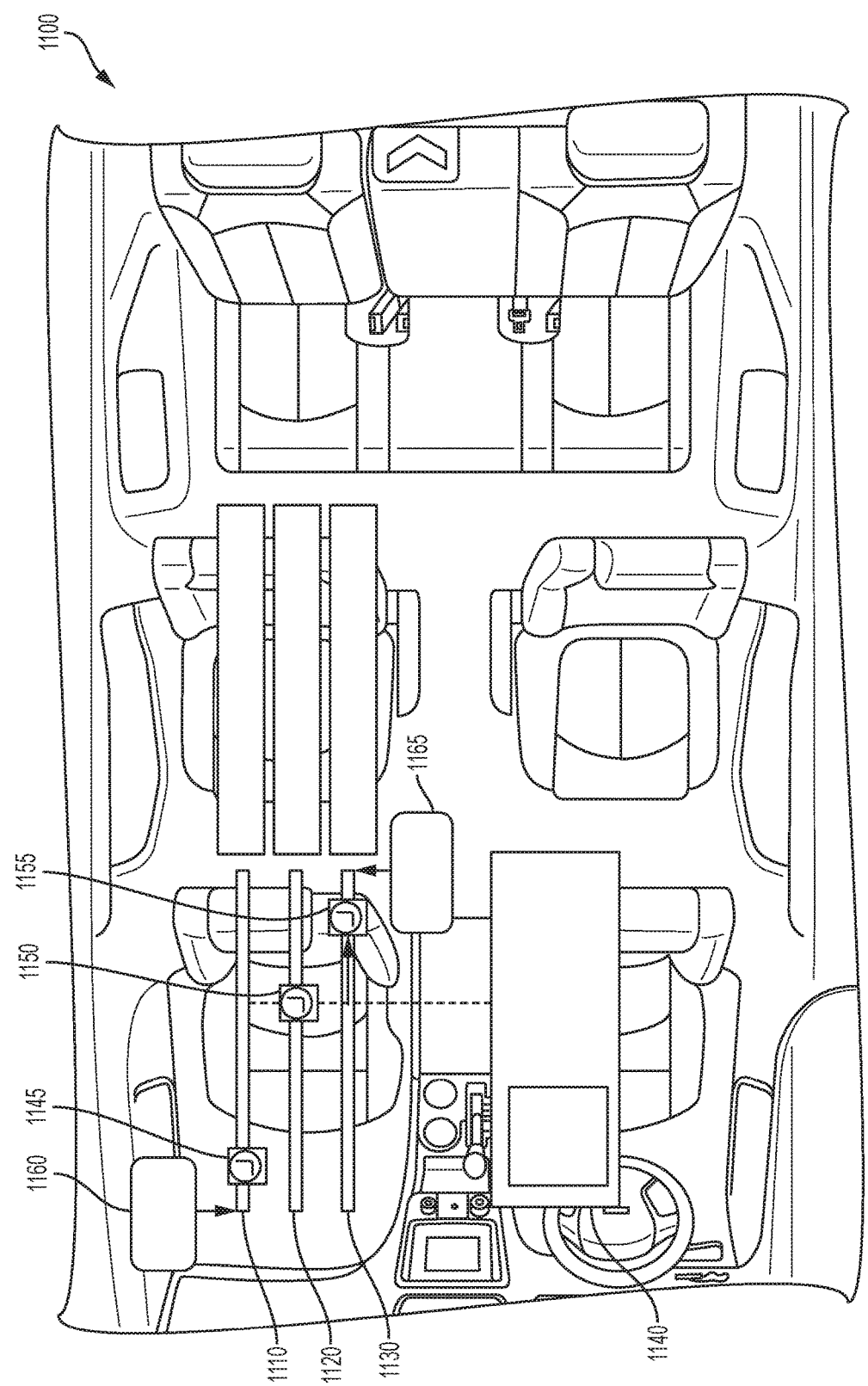
FIG. 11 is a snapshot of a graphic user interface of the seat adjustment system, in accordance with an embodiment.

FIG. 11 illustrates a screenshot of graphic user interface ("GUI") 1100 for the seat adjust system in accordance with an exemplary embodiment. The GUI includes at 1110, a seat forward length adjust, at 1120 a seat default position, and at 1130 a seat backward length adjustment with a vehicle incorporating seat adjustments with responses from the pressure sensors indicating passenger occupancy. The GUI 1100 provides a visual of the vehicle which may be a JEG image or graphic images where the GUI 1110 is layered onto the JPEG or graphic image so the user can ascertain visually by viewing the complete visual, the seat adjustments in the vehicle and gauge the amount for the forward and backward adjustments. In addition, an icon 1150 is shown which indicates the current default seat position set by 1140 with respect to icon 1145 of the seat forward length adjust position and icon 1155 of the seat backward length adjust position. Additionally, a max forward position is indicated by 1160 and a max backward position is indicated by 1165. The GUI 1100 provides a convenient means for setting ranges of the seat adjustment system of the seat movement in the backward and forward direction. In addition, while not shown, additional seat adjustments may be added to the GUI 1100 to adjust for example the recline and straight up positions of the seats. Also, additional seat adjustments may be added for the other seats in the vehicle and allow for seat adjustments in autonomous vehicles were, in instances, all the seats (including driver's seat) may need adjustments.

FIG. 12 illustrates a screenshot of graphic user interface ("GUI") 1200 for the seat adjust system in accordance with an exemplary embodiment. The GUI 1200 includes at 1210, a seat forward length adjust, at 1220 a seat default position, and at 1230 a seat backward length adjustment with a vehicle incorporating seat adjustments without the use of pressure sensors indicating passenger occupancy. The GUI 1200 provides a visual of the vehicle so the user can ascertain visual the seat adjustments. In addition, an icon 1250 is shown which indicates the current default seat position set at 1240 with respect to icon 1245 of the seat forward length adjust position and icon 1255 of the seat backward length adjust position. Additionally, a max forward position is indicated at 1260 of 70% for a safe point and a max backward position is indicated at 1265 of 80% for a safe point (for vehicles without proximity sensors for sensing safe points). In addition, these safe points and percentages can be further calibrated with machine learning solutions during vehicle operations and data sets of empirical use. The GUI 1200 provides a convenient means for setting ranges of the seat adjustment system of the seat movement in the backward and forward direction. In addition, while not shown, additional seat adjustments may be added to the GUI 1200 to adjust for example the recline and incline positions of the seats with particular preset maximum and minimum settings. Also, additional seat adjustments may be added for the other seats in the vehicle and allow for seat adjustments in autonomous vehicles were, in instances, all the seats may need adjustments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A seat adjustment system for a vehicle, the seat adjustment system comprising:
a plurality of sensors configured to produce sensor data associated with an occupancy by an internal or external user of a particular seat of the vehicle; and a processor, configured to receive the sensor data to:
determine a state of one or more settings of the seat adjustment system for the particular seat of the vehicle based on stored data or the received sensor data,
determine in a near future whether a particular seat will be occupied by the external user based on the received sensor data,
determine currently whether a particular seat is occupied by the internal user based on the received sensor data, and
determine currently whether a particular seat is not occupied by the internal user based on the received sensor data; and
adjust settings of the particular seat in accordance with determinations of the state of settings and occupancy of the particular seat, wherein the processor is coupled to a manual override switch and is further configured to:
activate or deactivate settings of the manual override switch wherein the manual override switch is responsive to an user input and is located within an arm length reach of the user in a front or rear seat of the vehicle, reset the manual override switch to a default settings in accordance to a select set of stages of operation of the vehicle,
activate in conjunction with a locking of the vehicle or when either the front or rear seats are occupied, and
deactivate the seat belt adjustment system by an user input of a physical touch movement of the manual override switch resulting in an immediate stop of seat adjustments.

2. The seat adjustment system of claim 1, further comprising:
configuring the manual override switch in the seat adjustment system of an autonomous driving system.

3. The seat adjustment system of claim 1, wherein the processor is configured to:
adjust the particular seat in a forward direction; and
adjust the particular seat in a backward direction wherein the adjust is based on the received sensor data.

4. The seat adjustment system of claim 1, wherein the received sensor data includes data from a sensor associated with a door of the vehicle which senses an opening or closing action of the door associated with the particular seat.

5. The seat adjustment system of claim 1, wherein the received sensor data includes data from a sensor associated with the particular seat which senses pressure on the particular seat.

6. The seat adjustment system of claim 1 wherein the received sensor data includes data from a sensor associated with the particular seat which senses an engaging or engagement of a seatbelt of the particular seat.

7. The seat adjustment system of claim 1,
wherein the processor is configured to:
determine whether in the near future the external user will enter the vehicle and be seated in the particular seat by processing the received sensor data from an external sensor wherein the received sensor data includes data from the external sensor sensed of the external user entering the vehicle to be seated in the particular seat wherein the external sensor can be deactivated by the manual override switch.

8. A method for adjusting seats within a vehicle, the method comprising:
configuring a plurality of sensors to produce sensor data associated with an occupancy by an internal or external user of a particular seat of the vehicle for use by a processor within the vehicle for adjusting the seats;
configuring one or more manual override switches of a set of manual override switches located in a set of locations in the vehicle enabling an arm length reach of the internal user of the particular seat of the vehicle and coupling the manual override switch to the processor wherein each manual override switch is located in a manner to enable accessibility to at least one or more internal users in the vehicle, the set of locations comprising: a location on a ceiling of the vehicle above an internal front seated user, a location in a pillar region between the internal front seated user and an internal rear seated user, and a location in a middle center console region between an internal driver user and the internal front seated user;
determining by the processor a state of one or more settings of adjustment for the particular seat of the vehicle based on stored data or the sensor data;
determining by the processor in a near future whether the particular seat will be occupied by the external user based on the sensor data;
determining by the processor currently whether the particular seat is occupied by the internal user based on the sensor data;
determining by the processor currently whether the particular seat is not occupied by the internal user based on the sensor data;
adjusting settings of the particular seat in accordance with determinations of the state of settings and occupancy of the particular seat;
activating or deactivating switch settings of the manual override switch wherein the manual override switch is responsive to an user input from the internal front or rear seated user;
resetting the manual override switch to a default settings in accordance to a select set of stages of operation of the vehicle;
activating the manual override switch in conjunction with a locking of the vehicle or when either the front or rear seats are occupied;
configuring the manual override switch in accordance with child lock features of the vehicle to prevent easy activation or deactivation on the part of a child; and
deactivating automated seat belt adjustments from operating by the user input of a physical touch of the manual override switch resulting in an immediate stop of operating automated seat adjustments.

9. The method of claim 8, further comprising:
adjusting by a graphic user interface on a display the settings of adjustment of the particular seat, and to preset or calibrate the manual override switch.

10. The method of claim 8, further comprising:
configuring the manual override switch in adjusting seats in an autonomous driving method.

11. The method of claim 8, further comprising:
taking an action by the processor based on the state of operating of the adjustment in response to a state of the override switch.

12. The method of claim, 11, the action by the processor further comprising:
adjusting the particular seat in a forward direction; and
adjusting the particular seat in a backward direction.

13. The method of claim 8, wherein the sensor data includes data from a sensor associated with a door of the vehicle which senses an opening or closing action of the door associated with the particular seat wherein the sensor sensing can be deactivated by the manual override switch.

14. The method of claim 8, wherein the received sensor data includes data from a sensor associated with the particular seat which senses an engaging or engagement of the particular seat.

15. The method of claim 8 wherein the received sensor data includes data from a sensor associated with the particular seat which senses pressure on the particular seat.

16. The method of claim 8, further comprising:
determining whether in the near future the external user will enter the vehicle and be seated in the particular seat by processing the received sensor data from an external sensor wherein the received sensor data includes data from the external sensor sensed of the external user entering the vehicle to be seated in the particular seat wherein the external sensor can be deactivated by the manual override switch.

17. The method of claim 16, wherein the sensor comprises light detection, proximity and LiDAR sensors.

18. A seat adjustment apparatus for a vehicle, comprising:
a plurality of sensors configured to produce sensor data associated with an occupancy by an internal or external user of a particular seat of the vehicle wherein the seat adjustment apparatus, further comprises:
one or more manual override switches of a set of manual override switches located in one or more locations of a set of locations in the vehicle within an arm length reach of the internal user of the particular seat of the vehicle and a coupling of the manual override switch to the processor wherein each manual override switch is located in a manner to enable accessibility by at least one or more internal users in the vehicle, the set of locations comprising: a location on a ceiling of the vehicle above an internal front seated user, a location in a pillar region between the internal front seated user and an internal rear seated user, and a location in a middle center console region between an internal driver user and the internal front seated user; and
a processor module, configured to receive the sensor data to:
  determine a state of one or more settings of a seat adjustment system for the particular seat of the vehicle based on stored data or the received sensor data;
  determine currently whether the particular seat is occupied by the internal user based on the received sensor data; and
  settings of the particular seat in accordance with a determination of the state of the setting and occupancy of the particular seat wherein the processor module is coupled to a manual override switch and is further configured to:
  activate or deactivate settings of the manual override switch wherein the manual override switch is responsive to an user input and is located within an arm length reach of the user in a front or rear seat of the vehicle,
  reset the manual override switch to a default settings in accordance to a select set of stages of operation of the vehicle,
  activated in conjunction with a locking of the vehicle or when either the front or rear seats are occupied, and
  deactivate the seat belt adjustment system by an user input of a physical touch movement of the manual override switch resulting in an immediate stop of seat adjustments.

19. The apparatus of claim 18, further comprising:
a configuration of the manual override switch in the seat adjustment system of an autonomous driving apparatus.

20. The apparatus of claim 19, further comprising:
a graphic user interface on a display with the vehicle for adjusting the settings of adjustment of the particular seat, and to preset or calibrate the manual override switch in the autonomous driving apparatus.

* * * * *

UNITED STATES PATENT AND TRADEMARK OFFICE
CERTIFICATE OF CORRECTION

PATENT NO. : 10,214,118 B1
APPLICATION NO. : 15/829396
DATED : February 26, 2019
INVENTOR(S) : Yashanshu Jain and Shashank Rameswaran Page 1 of 1

It is certified that error appears in the above-identified patent and that said Letters Patent is hereby corrected as shown below:

In the Claims

Column 23, Line 26, the word "adjust" should be added as the first word.

Signed and Sealed this
Thirty-first Day of March, 2020

Andrei Iancu
*Director of the United States Patent and Trademark Office*